March 25, 1930.  E. J. HALL ET AL  1,751,915
AIR CLEANER
Filed Jan. 4, 1926
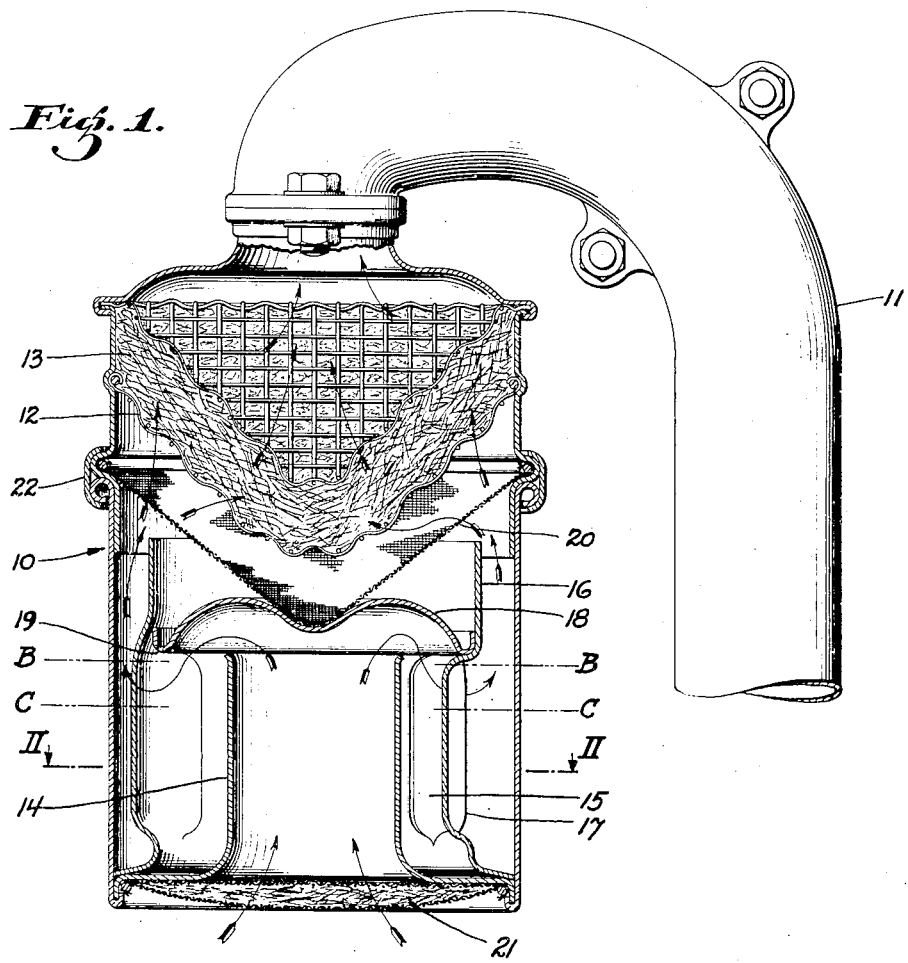
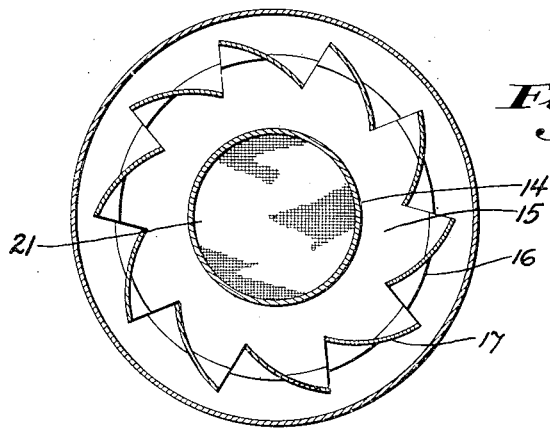
INVENTORS.
Elbert J. Hall
Charles A. Winslow.
BY Dewey, Strong, Townsend & Loftus
ATTORNEYS.

Patented Mar. 25, 1930

1,751,915

UNITED STATES PATENT OFFICE

ELBERT J. HALL, OF BERKELEY, CALIFORNIA, AND CHARLES A. WINSLOW, OF MICHIGAN CITY, INDIANA

AIR CLEANER

Application filed January 4, 1926. Serial No. 79,142.

This invention relates to air cleaners for use in connection with the air inlet of a carburetor. More particularly the invention relates to a wet filter type of air cleaner; that is, one wherein the air is brought into contact with a body of liquid, such as oil, and thence through a filter made of hair or the like. The oil is thereby frothed and acts to take up a portion of the dirt, and also serves to moisten and cleanse the filter.

An air cleaner of this general type is shown and described in the patent of Charles A. Winslow, Serial Number 697,046, filed March 5, 1924, now Patent No. 1,702,804, issued Feb. 2, 1929; and the present invention has for its object to simplify and improve the construction and operation of such an air cleaner.

One form which our invention may assume is exemplified in the following description and illustrated in the accompanying drawing, in which Fig. 1 shows a vertical central sectional view of an air cleaner embodying our invention;

Fig. 2 shows a plan view in section, taken on the line II—II of Fig. 1.

The device as herein shown comprises a tank 10 connected at its top by a pipe 11 with the air intake of a carburetor, not shown. Disposed within the tank near the top thereof is a conical basket 12, filled with hair 13 or the like. Air enters the tank through the bottom thereof by way of an open-ended pipe 14 spaced inwardly from the walls of the tank so as to form an annular chamber or reservoir 15 for oil or other liquid. Arranged in the annular reservoir is a cylindrical member 16, provided with inclined vanes 17, which impart a whirling movement to the air and oil. The cylindrical member 16 extends above the pipe 14 and is formed with a panel 18 extending across the upper end of the pipe 14, so as to prevent direct entrance of air to the filter and also to catch liquid draining from the filter. The oil or other liquid collecting upon the baffle 18 is returned to the reservoir 15 through openings 19.

Preferably there is a screen 20 below the basket, to prevent an excess quantity of oil from entering into the hair filter, and there is also a screen 21 disposed across the bottom of the pipe 14 to screen out large particles of dirt.

In the operation of the cleaner, the reservoir 15 is filled with oil or other liquid to the level line B—B. Suction from the engine draws this oil up along the walls of the tank until the level of the oil is lowered to the line C—C. The air enters through the pipe 14, passing over the top thereof and thence through the openings between the vanes 17, where it is given a whirling motion. This causes the oil to be whipped and frothed so that both the air and oil are carried upwardly between the walls of the tank and the cylindrical member 16. This whirling of the air and oil will tend to throw heavier particles of dirt (coated with oil) outwardly by centrifugal action. The air saturated with oil then passes through the screen 20, where some of the oil is removed, together with the dirt adhering thereto. Thereafter the air passes through the hair filter 13, where it is cleansed of the remaining dirt and oil before entering the pipe leading to the carburetor intake. As the filter 13 becomes saturated with oil, the oil will drain down upon the baffle 18 and will be returned to the reservoir through the openings 19.

The tank is preferably made in two sections, an upper and a lower section, clamped together by a band 22. This will permit the lower half to be detached for cleaning without disturbing the upper half. Also the baffle plate 18 is detachably mounted in the cylindrical member 16 to facilitate cleaning of the parts. The entire device is preferably constructed of thin sheet metal, and consequently can be made light and inexpensive. By providing an annular reservoir for the oil there is very little danger of the oil slopping out over the top of the pipe 14 when the cleaner is tilted.

Various changes in the construction and arrangement of the several parts may be employed without departing from the spirit of our invention as disclosed in the appended claims.

Having thus described our invention, what we claim as new and desire to secure by Letters Patent is:

1. An air cleaner comprising a casing having an outlet at its upper portion for connection with a suction device, a filter of fibrous material extending across the casing below said outlet, said casing having an opening in its bottom portion for admission of air, a standpipe surrounding the opening in the bottom and extending upwardly through the casing and forming in conjunction with the casing an annular reservoir for liquid, means to direct the air into the reservoir and submerged stationary means for directing incoming air through the reservoir to cause the liquid to swirl and froth so as to rise with the air along the walls of the casing and moisten and wash the filter.

2. An air cleaner comprising a casing having an outlet at its upper portion for connection with a suction device, a filter of fibrous material extending across the casing below the outlet, said casing having an opening in its bottom portion for admission of air, a standpipe surrounding the opening in the bottom and extending upwardly within the casing and forming in conjunction with the casing an annular reservoir for liquid, and a baffle disposed above the standpipe for directing air through the reservoir in contact with the liquid, and submerged stationary vanes in the reservoir for imparting a whirling motion to the air during its passage through or in contact with the liquid.

3. An air cleaner comprising a casing having an outlet at its upper portion for connection with a suction device, a filter of fibrous material extending across the casing below the outlet, said casing having an opening in its bottom portion for admission of air, a standpipe surrounding the opening in the bottom and extending upwardly within the casing and forming in conjunction with the casing an annular reservoir for liquid, a baffle disposed above the standpipe for directing air through the reservoir in contact with the liquid, and submerged stationary means in the reservoir for imparting a whirling motion to the air.

4. An air cleaner comprising a casing having an outlet in its upper portion for connection with a suction device, a filtering element comprising a conical basket extending across the casing below the outlet and filled with filtering material, said casing having an opening in its bottom, a standpipe surrounding the opening and extending upwardly within the casing and forming in conjunction with the latter an annular reservoir, a perforated cylindrical member arranged in the reservoir, a baffle disposed above the standpipe and below the filtering element for directing incoming air through the perforated member in the reservoir whereby the air comes in contact with the liquid and the liquid is carried into the filtering material, said baffle being so arranged as to return the liquid draining from the filtering material back into the reservoir.

ELBERT J. HALL.
CHARLES A. WINSLOW.